United States Patent [19]
Neal et al.

[11] 4,320,783
[45] Mar. 23, 1982

[54] STABILIZED HOSE ASSEMBLY FOR TRANSMITTING FLUID

[75] Inventors: James G. Neal; Warren J. Stafford, both of Peoria, Ill.

[73] Assignee: Caterpillar Tractor Co., Peoria, Ill.

[21] Appl. No.: 166,261

[22] PCT Filed: Jan. 17, 1980

[86] PCT No.: PCT/US80/00040
§ 371 Date: Jan. 17, 1980
§ 102(e) Date: Jan. 17, 1980

[87] PCT Pub. No.: WO81/02055
PCT Pub. Date: Jul. 23, 1981

[51] Int. Cl.³ .............................................. F16L 7/00
[52] U.S. Cl. ..................... 138/110; 138/109; 138/178; 138/DIG. 8; 137/351; 414/696; 414/918
[58] Field of Search ............... 138/106, 109, 110, 118, 138/178, DIG. 8; 285/45, 114; 414/696, 918; 137/351

[56] References Cited

U.S. PATENT DOCUMENTS

| | | | |
|---|---|---|---|
| 1,044,013 | 11/1912 | Burnett | 138/110 X |
| 1,156,145 | 10/1915 | Jenkins | 138/110 X |
| 1,191,888 | 7/1916 | Alauber | 138/110 X |
| 1,683,023 | 9/1928 | Champion | 138/110 X |
| 1,971,500 | 8/1934 | Palmer | 138/110 X |
| 2,700,988 | 2/1955 | Smisko | 138/110 |
| 3,127,194 | 3/1964 | Jeffries | 137/351 X |
| 3,853,148 | 12/1974 | Vincent et al. | 138/110 |
| 3,901,270 | 8/1975 | Smith | 137/351 |

FOREIGN PATENT DOCUMENTS 149514 4/1955 Sweden .................. 138/110

Primary Examiner—James E. Bryant, III
Attorney, Agent, or Firm—Phillips, Moore, Weissenberger, Lempio & Majestic

[57] ABSTRACT

A flexible hose assembly (10) transmits fluid between relatively movable components, such as a drive motor (16) secured to the main frame (14) of a vehicle (12) and pressurized fluid supply ports (13) resiliently supported on the main frame (14), in a constricted region where typical hose motions could result in chafing or cutting from contacts with adjacent structure. A flexed portion (39) of the hose (38) extends within a curved tubular rigid sleeve (47) which is fixed relative to one (16) of the fluid transmitting components (16, 13) and free of rigid attachment to the other (13). The diameter of the inside passage (51) of the sleeve (47) is greater than that of the hose (38) enabling limited necessary flexing while preventing more sizable and potentially damaging hose (38) movements. The curved hose portion (39) may have a radius of curvature smaller than the normal minimum bending radius as the sleeve (47) restrains kinking by preventing concentration of bending forces at one point on the hose (38).

9 Claims, 3 Drawing Figures

STABILIZED HOSE ASSEMBLY FOR TRANSMITTING FLUID

DESCRIPTION

TECHNICAL FIELD

This invention relates generally to fluid conduits and more particularly to apparatus in which flexible hose is used for transmitting fluid between spaced apart fluid system components.

BACKGROUND ART

Flexible hoses are extensively used to transmit fluid between spaced apart components of a fluid system that may undergo relative movement or, in some instances, to transmit fluid along a convoluted fixed flow path where the fitting in of a rigid conduit may be difficult due to obstruction from adjacent structure. Flexible resilient hydraulic hoses, often containing wire reinforcement to resist high pressures, are commonly employed for example in earthworking vehicles to couple fluid motors with a pressurized fluid supply where the motors and fluid supply may undergo relative movement. In such usages, hoses provide a simple economical and adaptable solution to what might otherwise be difficult fluid transmission problems.

In some usages these advantages are offset at least to some extent by certain inherent characteristics of conventional flexible hose. Hoses are relatively fragile in comparison with rigid conduits and may be exposed to chafing, abrasion and cutting from contacts with adjacent structures in contexts where the hose must be situated in a constricted or partially obstructed space.

The problem of avoiding hose damage in such contexts is aggravated by an inherent positional instability of flexible hoses. Hoses shift position and configuration not only in response to movement of the components to which they are attached but also in response to changes in the pressure of the transmitted fluid. Internal pressure rises typically cause curved portions of a hose to straighten out to some extent. The variable forces acting on a hose under dynamic conditions are often complex and may cause squirming and displacements of the hose in a somewhat unpredictable manner. Where the hose must be situated in a confined space, problems with possible abrasion and damage are greatly increased by such movements.

Another problem encountered in certain usages of flexible hose is difficulty of installation. In order to engage the ends of the hose on associated fixed structures, the hose must be flexed and held in a precise configuration. This can be a taxing operation particularly when installing heavy resilient high pressure hose within a confined space.

A further very significant limitation on the usage of flexible hoses has existed as a result of the need to avoid kinking. Hoses made of resilient material inherently resist kinking as long as the radius of curvature is greater than a particular value determined by the material and dimensions of the particular hose. A specific type of hose has a minimum bending radius or radius of curvature that is determined at least in part by the susceptibility of the particular hose to kinking. Heretofore, if the hose is flexed more sharply than is allowed by the minimum bending radius, there is a significant risk that the bending forces will cease to be distributed uniformly along the desired curve and will concentrate at one point resulting in a kink which interferes with operation of the system. There are, however, many potential applications for flexible hose where smaller radii of curvature may be necessary or at least desirable.

As a result of the several characteristics discussed above, it has not been practical to use flexible hose in certain applications where it might otherwise be advantageous. In other instances, it has been necessary to complicate the design of adjacent rigid structures to enable use of hose. The general durability of hydraulic hoses has been adversely affected by the above described effects and installation and maintenance procedures have been undesirably complicated by such characteristics.

The present invention is directed to overcoming one or more of the problems as set forth above.

DISCLOSURE OF THE INVENTION

In one aspect of the present invention a fluid system having a fluid transmitting component and a flexible hose which includes a curved portion and an end connected to the fluid transmitting component is further provided with a curved rigid sleeve member disposed in a fixed position relative to the end of the hose and the fluid transmitting component. The rigid sleeve member has a curvilinear inside passage through which the curved portion of the hose extends, the curvilinear inside passage having a diameter greater than that of the hose and being of a construction which enables limited movements within the curved sleeve member of the curved portion of the hose relative to the sleeve member and the fluid transmitting component while maintaining the curved portion within a predetermined range of curvatures.

In another aspect of the invention, the inside passage of the rigid sleeve member has a radius of curvature smaller than the radius at which kinking of the hose may occur in the absence of the sleeve member.

The invention provides a positionally stabilized fluid transmitting hose assembly in which a length of flexible hose is maintained within a predetermined range of curvatures and is protected against damage from contacts with adjacent structure while being capable of a limited necessary amount of movement including limited changes of curvature. The invention enables use of flexible hose in constricted or partially obstructed regions where conventional hose constructions would be subject to abrasion or other damage because of the presence of adjacent structures. Installation and removal is facilitated, particularly in connection with heavy high pressure hose, as curved portions of the hose are maintained in the operating configuration at all times. The invention inhibits kinking by preventing a concentration of bending force at a single point along a curved portion of hose. Consequently, flexible hose may be employed in contexts requiring a greater degree of curvature than has heretofore been considered acceptable for the specific type of hose.

BEST MODE FOR CARRYING OUT THE INVENTION

Figure 1:
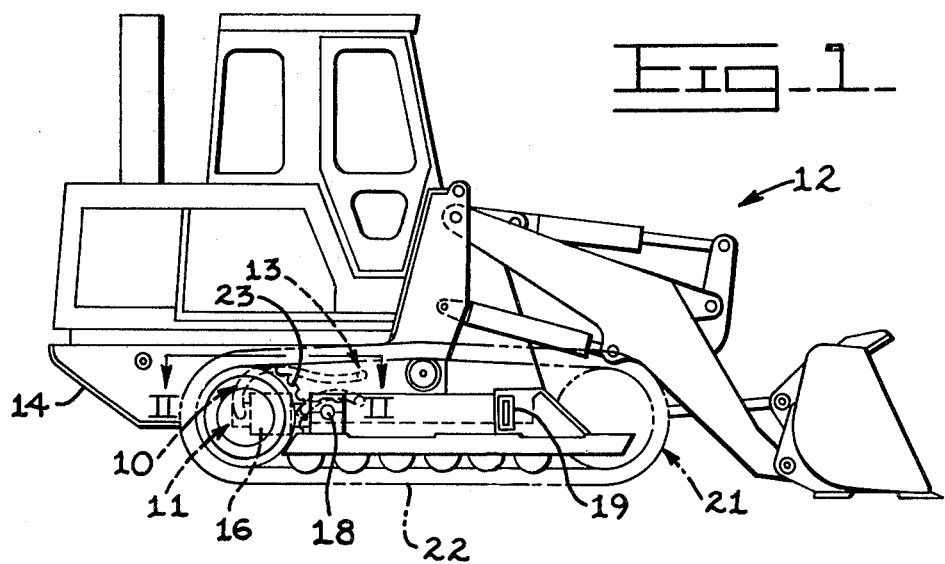
FIG. 1 is a side elevation view of a hydrostatically driven loader vehicle utilizing an embodiment of the invention for transmitting high pressure hydraulic fluid between spaced apart relatively movable components of the drive system.

Referring initially to FIG. 1 of the drawings a hose assembly or conduit means 10 embodying the invention is depicted in the context of a hydrostatic drive fluid system 11 of a crawler track type loader vehicle 12. In this particular usage, hose assembly 10 transmits fluid between a fluid motor 16 mounted on the inside surface of a main frame side member 14 of the vehicle and pressurized fluid supply ports 13 which are resiliently supported on the main frame 14 and which may therefore undergo a small amount of movement relative to the motor. Fluid motor 16 drives the crawler track 22 through final drive gearing 17 and the rear sprocket 23 of the track assembly 21. It should be understood that hose assemblies 10 in accordance with the invention are also adaptable to other fluid systems which require a curvilinear flow path of variable configuration.

Figure 2:
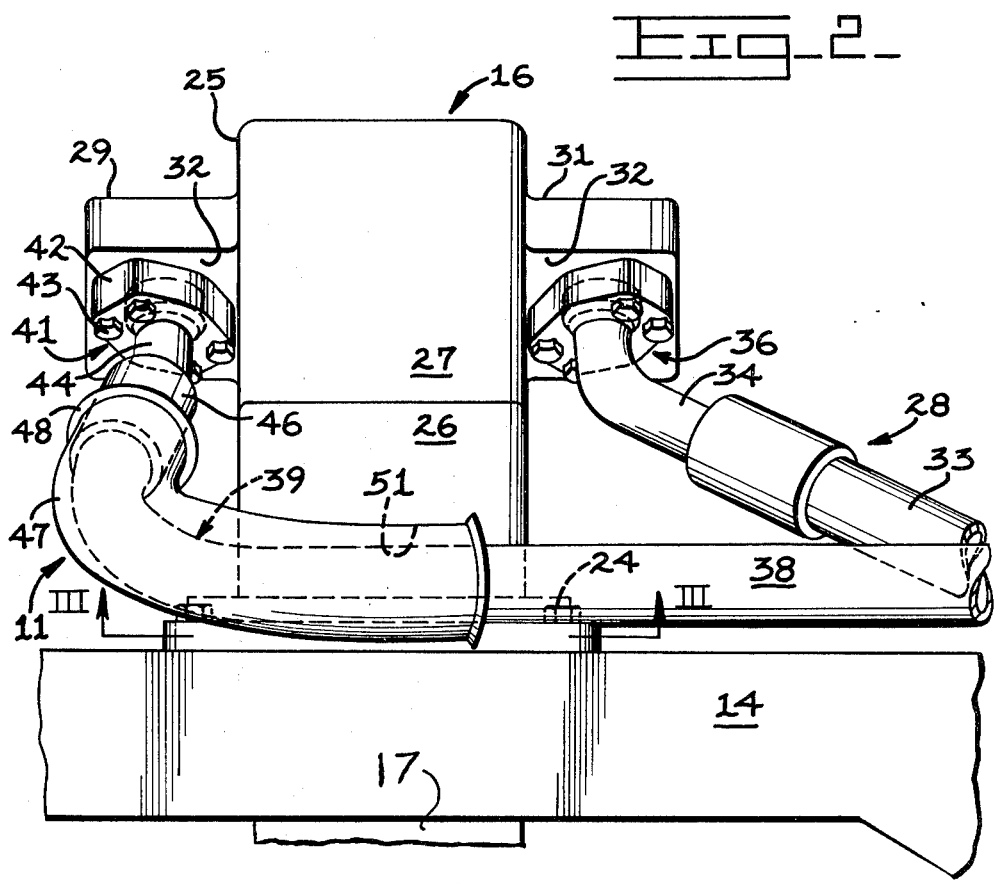
FIG. 2 is a plan view of a portion of the vehicle of FIG. 1.
Figure 3:
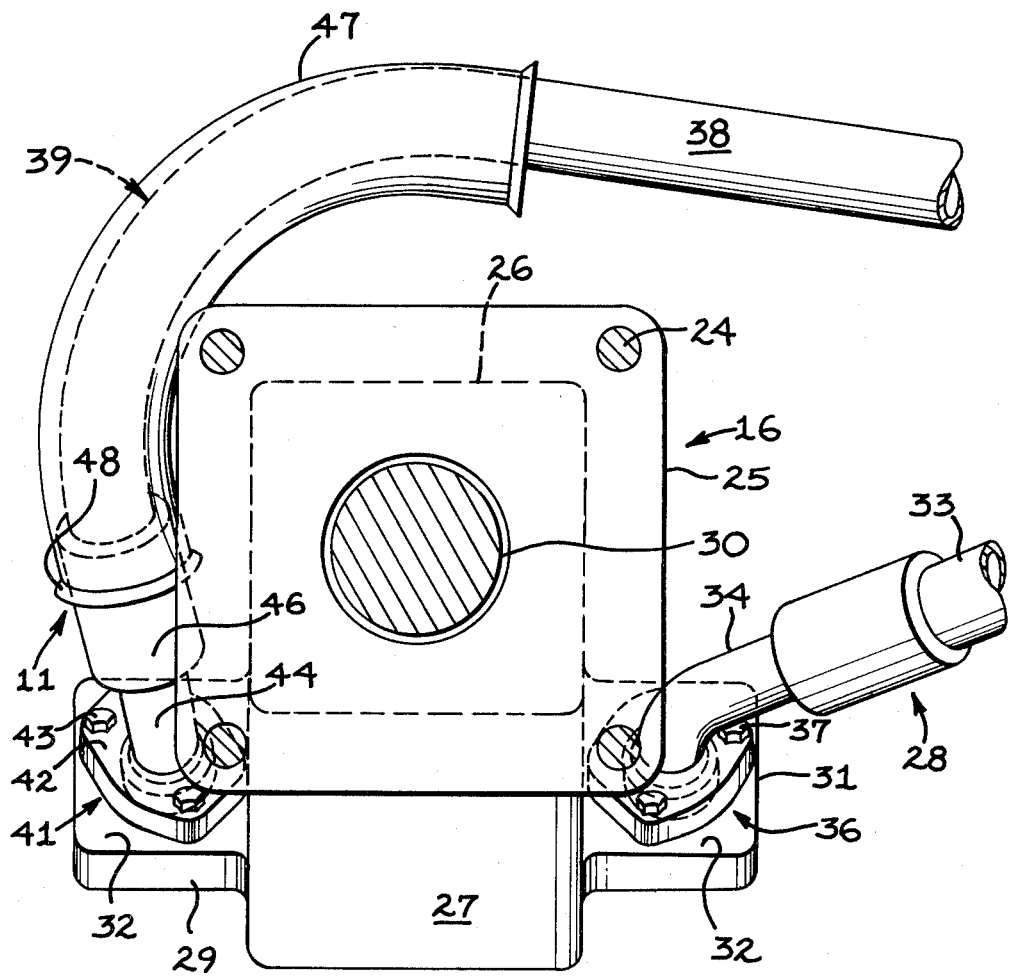
FIG. 3 is an elevation section view taken along line III—III of FIG. 2 and further illustrating the structure depicted therein.

Referring now to FIGS. 2 and 3 in conjunction, motor 16 has a housing 25 of generally rectangular cross section secured to the inside surface of main frame member 14 by bolts 24. Motor housing 25 has an upper portion 26 which extends directly inward towards the other side of the vehicle 12 and further has a lower portion 27 which is angled downwardly relative to the upper portion 26. Output shaft 30 of the motor 16, shown in FIG. 3, drives the sprocket 23 of the crawler track assembly 21 shown in FIG. 1.

Referring again to FIGS. 2 and 3 in conjunction, high pressure fluid is transmitted to motor 16 through hose assembly 10 or through a second hose assembly 28, depending on the direction of drive of the motor at a given time, with fluid being returned from the motor through the other of the hose assemblies 10 and 28. Hose assemblies 10 and 28 connect with fluid manifolds 29 and 31 respectively which extend from the rear and front surfaces respectively of the lower portion 27 of motor 16. The upper surfaces 32 of manifolds 29 and 31 to which the hose assemblies 11 and 28 connect are oblique relative to the underlying ground surface because of the angling of lower portion 27 of the motor housing 25.

Accordingly, from manifolds 29 and 31 both hose assemblies 10 and 28 must extend outwardly and upwardly and then in a forward direction to connect with the fluid supply ports 13 shown in FIG. 1, hose assembly 10 being connected to the supply ports at the more elevated position.

Referring again to FIGS. 2 and 3 in conjunction, the above described configuration of adjacent structures in the region of hose assemblies 10 and 28 dictates that the hose assembly 10 in particular have a relatively sharp curvature and also locates the hose assembly 10 in relatively close proximity to adjacent structures, such as main frame member 14, then is the case with hose assembly 28 which is lowermost and which need not pass around the bulky motor housing 25. Hose assembly 28 may therefore be of essentially conventional design. In particular hose assembly 28 may include a suitable length of flexible resilient hydraulic hose 33 engaged on a suitably angled rigid tubular element 34 of a fitting 36 secured to the surface 32 of front manifold 31.

In contrast to the relatively relaxed positional tolerances and curvatures of hose assembly 28, the hose assembly 10 must pass close to adjacent structures, such as main frame member 14 and motor 16 and the portion of the hose in the region of the motor must be sharply curved. In this particular example the portion 39 of the hose assembly 10 in the region of motor 16 must necessarily have a radius of curvature shorter than that heretofore considered to be a minimum acceptable bending radius for the particular type of heavy high strength hydraulic hose 38 which is employed in hose assembly 10. Heretofore the risk of kinking and consequent interference with operation of the system has been considered to prohibit curvature of this particular type of high strength hose 38 to the degree required in the present example.

In addition to the disposition of the hose assembly 10 close to potential sources of chafing or cutting and in addition to the seemingly undesirable sharp curvature which is required, installation and removal of the hose assembly would be taxing if it were of conventional construction. The heavy resilient hose 38 would need to be flexed and held at a precise configuration, against considerable resistance arising from the resiliency of the hose material, during connection and disconnection operations at the rear manifold 29. The hose assembly 10 construction avoids these problems.

Hose assembly 10 includes a fitting 41 at the end of a curved end portion 39 of a length of flexible hydraulic hose 38. Fitting 41 has a flange 42 secured to surface 32 of rear manifold 29 by bolts 43 and further has an angled tubular fluid transmitting element 44 which extends a short distance into the end 46 of hose 38, the end 46 of the hose being of enlarged diameter relative to the adjacent portions of the hose 38 and being permanently secured to fitting element 41 by internal means (not shown) of known construction. From fitting 41, the curved end portion 39 of hose 38 extends upwardly and forwardly over motor 16.

Curvature limiting means in the form of a curved, tubular, rigid sleeve member 47 has an end 48 fitted onto the fluid transmitting element 44 of fitting 41 over end 46 of hose 38 and retained thereon by friction. Thus, through hose end 46 and fitting 41, sleeve member 47 is maintained in a fixed position relative to motor 16.

Sleeve member 47 has an inside passage 51 through which the curved portion 39 of hose 38 extends and which is of greater diameter than the hose 38 in order to enable limited movements of hose portion 39, including changes of curvature, while maintaining the hose portion within a predetermined range of positions and curvatures. The positional limits for hose portion 39 that are established by the curved rigid sleeve member 47 are selected to enable the necessary amount of flexing and displacements of the hose relative to motor 16 while preventing contact of the hose with adjacent structures.

The inside passage 51 of sleeve member 47 in this example has a radius of curvature shorter than the radius heretofore considered to be the minimum bending radius for avoiding kinking of the particular hose 38. The minimum bending radius is dependent on the materials and internal construction of the hose 38 and on hose dimensions and is therefore different in different specific types of hose. In general, heavy high pressure hoses such as are required in the vehicle 12 of FIG. 1 have large minimum bending radii which may not be accommodatable in constricted or convoluted flow path regions.

INDUSTRIAL APPLICABILITY

The hose assembly 10 was initially designed to provide a flexible high pressure fluid flow path between a drive motor 16 secured to a main frame member 14 of a loader vehicle 12 and the associated resiliently mounted fluid supply ports 13 which may undergo movements, relative to the motor, in response to vibration and shocks. The space available for the hose assembly 10 in this context is constricted by adjacent structure of the vehicle 12 and is partially obstructed by the bulky motor housing 25. The presence of the motor housing 25 requires that one portion 39 of the hose assembly 10 have a high degree of curvature which, in this particular example, is greater than would be considered acceptable, from the standpoint of avoiding kinking, in the absence of the present invention. Hose assemblies 10 in accordance with the invention may also be employed in other fluid systems where one or more of these conditions are encountered.

In operation, hose 38 may change configuration and position to the extent necessary to accommodate to movements of the pressurized fluid supply ports 13 relative to drive motor 16 and to adjust to internal pressure changes but the extent of such movement of the curved portion 39 of the hose 38, relative to motor 16, is limited by the rigid sleeve member 47. The predetermined limits of movement, including curvature limits, of hose portion 39 keep the hose portion 39 from moving into contact with adjacent structures which might cause chafing, cutting or other damage. As sleeve member 47 limits the extent to which the curved portion 39 of the hose can straighten out in response to increases of internal pressure, the sleeve member also reduces the extent of movement of the hose 38 as a whole in response to pressure changes.

Installation and removal of the hose assembly 10 is facilitated as the sleeve member 47 holds the curved portion 39 of the hose 38 in the desired curvilinear configuration, against the inherent resilient forces tending to straighten out the hose, during periods when fitting 41 is being engaged or disengaged.

Further, sleeve member 10 prevents kinking of the curved portion 39 of the hose 38 as bending forces cannot concentrate significantly at any one point along the curved portion 39 of the hose but instead must necessarily remain fairly uniformly distributed along the curved portion.

Other aspects, objects and advantages of this invention can be obtained from a study of the drawings, the disclosure and the appended claims.

We claim:

1. In a fluid system (11) having a fluid transmitting component (16) and a flexible hose (38) including a curved portion (39) and including an end (46) connected to said fluid transmitting component (16), the improvement comprising:
   a curved rigid sleeve member (47) disposed in a fixed position relative to said end (46) of said hose (38) and said fluid transmitting component (16) and having a curvilinear inside passage (51) through which said curved portion (39) of said hose (38) extends, said curvilinear inside passage (51) having a diameter greater than the diameter of said hose (38) and being of a construction sufficient for enabling limited movements within said curved sleeve member (47) of said curved portion (39) of said hose (38) relative to said sleeve member (47) and said fluid transmitting component (16) while maintaining said curved portion (39) of said hose (38) within a predetermined range of curvatures.

2. The apparatus set forth in claim 1 wherein said curvilinear inside passage (51) of said rigid sleeve member (47) has a radius of curvature smaller than the radius at which kinking of said hose (38) may occur in the absence of said sleeve member (47).

3. The apparatus set forth in claim 1 wherein said rigid sleeve member (47) has a length shorter than that of said hose (38).

4. The apparatus set forth in claim 1 further comprising a fluid transmitting fitting (41) at said end (46) of said hose, said fitting (41) being coupled to said fluid transmitting component (16), said rigid sleeve member (47) having an end (48) engaging said fitting (41).

5. The apparatus set forth in claim 4 wherein said fitting (41) has a rigid tubular fluid transmitting element (44), said ends (46, 48) of said hose (38) and said rigid sleeve member (47) being positioned on said element (44) in coaxial relationship therewith.

6. In fluid transmitting apparatus (11) having a first component (16), a second spaced apart component (13) and a flexible hose (38) extending between said components (16, 13) and having a curvilinear portion (39), the improvement comprising:
   a rigid tubular curvilinear sleeve member (47) enclosing said curvilinear portion (39) of said hose (38), said rigid sleeve member (47) having a fixed position relative to said first component (16) and being free of rigid attachment to said second component (13), said rigid sleeve member (47) having an internal passage (51) through which said hose (38) extends and which has a diameter greater than that of said hose (38) and being of a construction sufficient for enabling only limited predetermined degrees of movement and bending of said curvilinear portion (39) of said hose (38) relative to said sleeve member (47) within said passage (51) of said sleeve member (47).

7. A fluid conduit assembly (10) comprising:
   a fluid transmitting fitting (41);
   means (43) for attaching said fitting to fluid transmitting apparatus (16),
   a length of flexible resilient hose (38) having a curved portion (39) and having an end (46) engaged on said fitting (41), and
   a tubular curvilinear rigid sleeve member (47) having an internal passage (51) through which said curved portion (39) of said hose (38) extends and having an end (48) engaged on said fitting (41) in a fixed predetermined orientation relative thereto, said internal passage (51) being of greater transverse diameter than said hose (38) and being adapted to enable only a limited predetermined degree of flexing movement of said hose (38) within said sleeve member (47) relative to said sleeve member (47) and said fitting (41).

8. In a fluid system (11) having a fluid transmitting component (16) and additional structure (14) and having conduit means (10) for defining a curvilinear flow path of variable configuration and position which connects with said component (16) and which extends in proximity to said additional structure (14), said conduit means (10) including a flexible hose (38) having an end (46) connected to said component (16) and having a curved portion (39) extending along said flow path, the improvement comprising curvature limiting means (47)

for maintaining the curvature of said curved portion of said hose (38) within a predetermined range of curvatures including a maximum curvature and a minimum curvature, said range of curvatures being selected to prevent contact of said hose (38) with said additional structure (14) while enabling limited motions of said curved portion (39) of said hose (38) relative to said component (16) and relative to said curvature limiting means (47).

9. The apparatus set forth in claim 8 wherein said range of curvatures includes curvatures at which kinking of said hose (38) may occur in the absence of said curvature limiting means (47).

* * * * *